United States Patent
Montreuil et al.

(10) Patent No.: US 12,107,705 B2
(45) Date of Patent: Oct. 1, 2024

(54) LTF SEQUENCES FOR 320 MHZ WIFI CHANNELS

(71) Applicant: Avago Technologies International Sales Pte. Limited, Singapore (SG)

(72) Inventors: Leo Montreuil, Atlanta, GA (US); Ron Porat, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 357 days.

(21) Appl. No.: 17/503,168

(22) Filed: Oct. 15, 2021

(65) Prior Publication Data

US 2022/0141052 A1   May 5, 2022

Related U.S. Application Data

(60) Provisional application No. 63/108,822, filed on Nov. 2, 2020.

(51) Int. Cl.
| | |
|---|---|
| *H04L 25/00* | (2006.01) |
| *H04L 25/02* | (2006.01) |
| *H04L 27/26* | (2006.01) |
| *H04W 72/044* | (2023.01) |
| *H04L 5/00* | (2006.01) |
| *H04W 84/12* | (2009.01) |

(52) U.S. Cl.
CPC ........ *H04L 25/0226* (2013.01); *H04L 27/262* (2013.01); *H04W 72/044* (2013.01); *H04L 5/0007* (2013.01); *H04W 84/12* (2013.01)

(58) Field of Classification Search
None
See application file for complete search history.

(56) References Cited

U.S. PATENT DOCUMENTS

| | | |
|---|---|---|
| 2017/0126453 A1 | 5/2017 | Montreuil et al. |
| 2019/0289612 A1* | 9/2019 | Chen .................. H04L 27/2613 |

(Continued)

FOREIGN PATENT DOCUMENTS

| | | | | |
|---|---|---|---|---|
| EP | 3806426 A1 * | 4/2021 | ........... | H04L 1/0071 |
| WO | WO 2017/011274 A1 | 1/2017 | | |
| WO | WO-2021071139 A1 * | 4/2021 | | |

OTHER PUBLICATIONS

Lui et al., "Joint Sounding for Multi-AP Systems," IEEE Draft 802.11-19/1593r3, Sep. 2019, retrieved from https://mentor.ieee.org/802.11/dcn/19/11-19-1593-03-00be-joint-sounding-for-multi-ap=systems.pptx, 20 pages.

(Continued)

*Primary Examiner* — Gerald A Smarth
(74) *Attorney, Agent, or Firm* — Foley & Lardner LLP

(57) ABSTRACT

A wireless communication device includes a communication interface and processing circuitry coupled to the communication interface. At least one of the communication interface or the processing circuitry can generate an orthogonal frequency-division multiple access (OFDMA) frame that includes a preamble that specifies allocation of at least one resource unit (RU) for a communication channel or nonallocation of the at least one RU for the communication channel. The preamble includes at least one long training field (LTF) to be used by a receiver for channel estimation. The LTF includes an extremely high-throughput (EHT)-LTF sequence.

22 Claims, 14 Drawing Sheets

(56) References Cited

U.S. PATENT DOCUMENTS

2021/0399933 A1* 12/2021 Wu ................. H04L 27/2621
2023/0104295 A1* 4/2023 Yang ................ H04L 27/2621
                                                                                         370/329

OTHER PUBLICATIONS

Montreuil et al., "2x 320MHz EHT-LTF Design," IEEE Draft 802.11-20/1311r2, Sep. 2020, retrieved from https://mentor.jeee.org/802.11/dcn/20/11-20-1311-02-00be-2x-320mhz-ltf-design.pptx, 12 pages.

Vermani et al., Performance Comparison of LTF Designs for EHT, IEEE Draft 802.11-19/1867r0, Nov. 2019, retrieved from https://mentor.IEEE.org/802.11/don/19/11-19-1867-00-00be-performance-comparisons-for-ltf-designs-for-eht.pptx, 12 pages.

Wu et al., Follow up discussions on Throughput Enhancement, IEEE Draft 802.11-17/1184r1, Aug. 2018, retrieved from https://mentor.ieee.org/802.11/dcn/18/11-18-1184-01-0eht-eht-discussions-on-throughput-enhancement.pptx, 17 pages.

Partial European Search Report from European Patent Application No. 21205275.7, dated Mar. 24, 2022, 17 pages.

\* cited by examiner

[figure showing UNII5, UNII6, UNII6/7, UNII7, UNII7/8, UNII8 bandwidth blocks]

| PPDU bandwidth | Cases | Puncturing pattern (RU or MRU Index) | Field value |
|---|---|---|---|
| 320 MHz | No puncturing | [1 1 1 1 1 1 1 1]<br>(4×996-tone RU 1) | 0 |
| | 40 MHz puncturing | [x 1 1 1 1 1 1 1]<br>(3×996+484-tone MRU 1) | 1 |
| | | [1 x 1 1 1 1 1 1]<br>(3×996+484-tone MRU 2) | 2 |
| | | [1 1 x 1 1 1 1 1]<br>(3×996+484-tone MRU 3) | 3 |
| | | [1 1 1 x 1 1 1 1]<br>(3×996+484-tone MRU 4) | 4 |
| | | [1 1 1 1 x 1 1 1]<br>(3×996+484-tone MRU 5) | 5 |
| | | [1 1 1 1 1 x 1 1]<br>(3×996+484-tone MRU 6) | 6 |
| | | [1 1 1 1 1 1 x 1]<br>(3×996+484-tone MRU 7) | 7 |
| | | [1 1 1 1 1 1 1 x]<br>(3×996+484-tone MRU 8) | 8 |
| | 80 MHz puncturing | [x x 1 1 1 1 1 1]<br>(3×996-tone MRU 1) | 9 |
| | | [1 1 x x 1 1 1 1]<br>(3×996-tone MRU 2) | 10 |
| | | [1 1 1 1 x x 1 1]<br>(3×996-tone MRU 3) | 11 |
| | | [1 1 1 1 1 1 x x]<br>(3×996-tone MRU 4) | 12 |

FIG. 8B

LTF SEQUENCES FOR 320 MHZ WIFI CHANNELS

CROSS-REFERENCE TO RELATED APPLICATIONS

This application claims the benefit of priority under 35 U.S.C. § 119 from U.S. Provisional Patent Application 63/108,822, filed Nov. 2, 2020, which is incorporated herein by reference in its entirety.

TECHNICAL FIELD

The present description relates generally to wireless communication and, in particular, long training field (LTF) sequences for 320 MHz Wi-Fi channels and distributed resource unit (dRU)-LTF sequences for 20, 40 and 80 MHz Wi-Fi channels.

BACKGROUND

The Institute of Electrical and Electronics Engineers (IEEE) 802.11 standard is part of the IEEE 802 set of local area network (LAN) protocols and specifies the set of media access control (MAC) and physical layer (PHY) protocols for implementing wireless LAN (WLAN) Wi-Fi computer communication in various frequencies. The frequency bands of interest include, but are not limited to, 2.4 GHz, 5 GHz, 6 GHz and 60 GHz frequency bands. IEEE 802.11be, or extremely high throughput (EHT), is the potential next amendment of the 802.11 IEEE standard. It can build upon 802.11 ax, focusing on WLAN indoor and outdoor operation with stationary and pedestrian speeds.

Wi-Fi receivers are required to estimate communication-channel characteristics, which is required for proper equalization of a received signal. Channel estimation is performed based on long training field (LTF) symbols received by the receiver. The LTF symbols are accompanied by noise added by the wireless channel.

BRIEF DESCRIPTION OF THE DRAWINGS

Certain features of the subject technology are set forth in the appended claims. However, for purposes of explanation, several embodiments of the subject technology are set forth in the following figures.

FIGS. 5A and 5B are diagrams, illustrating an example of a 2×320 MHz EHT-LTF base sequence, and an example of an LTF formed based on the base sequence, respectively, in accordance with some aspects of the subject technology.

FIGS. 5C, 5D, 5E, 5F, 5G and 5H are diagrams illustrating examples of distributed RU (dRU) LTF base sequences, respectively, in accordance with some aspects of the subject technology.

FIGS. 8A and 8B are tables illustrating an example of a spectrum configuration for forming a 320 MHz band and an example of a punctured channel indication patterns, respectively.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to methods and systems for providing long-training field (LTF) sequences for 320 MHz Wi-Fi channels and distributed resource unit (dRU)-LTF (dLTF) sequences for 20, 40 and 80 MHz. The LTF sequence includes symbols that are used by a receiver for channel estimation. The disclosed LTF sequences can be provided for 320 MHz based on 80 MHz base sequences.

Figure 1:
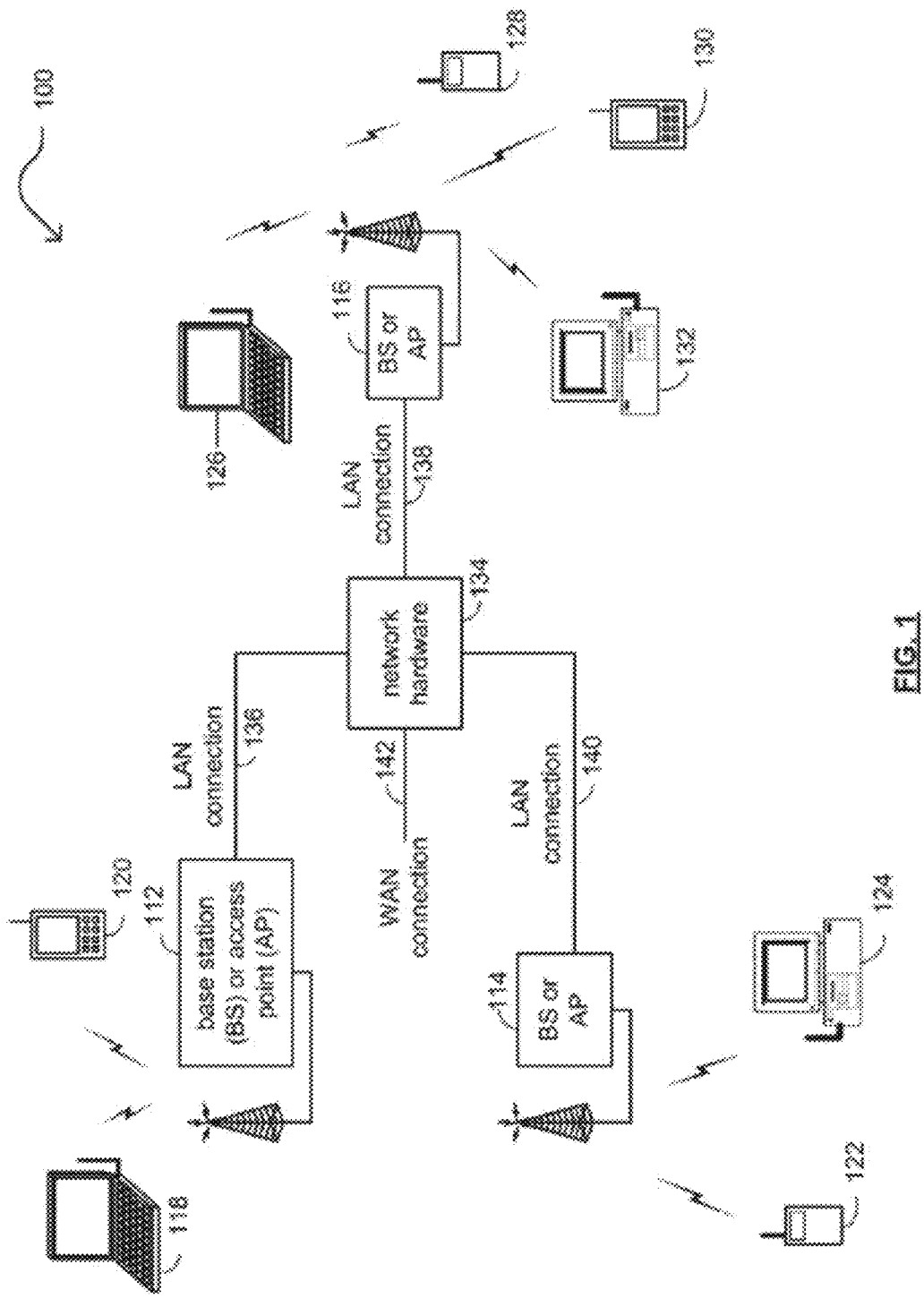
FIG. 1 is a diagram illustrating an embodiment of a wireless communication system in which some aspects of the subject technology can be implemented.

FIG. 1 is a diagram illustrating an embodiment of a wireless communication system 100 in which some aspects of the subject technology can be implemented. The wireless communication system 100 includes base stations and/or access points 112, 114 and 116; wireless communication devices 118-132 (e.g., wireless stations (STAs)); and a network hardware component 134. The wireless communication devices 118-132 may be laptop computers, or tablets, 118 and 126; personal digital assistants 120 and 130; personal computers 124 and 132; and/or cellular telephones 122 and 128. Other examples of such wireless communication devices 118-132 could also or alternatively include other types of devices that contain wireless communication capability. The details of an embodiment of such wireless communication devices are described in greater details with reference to FIG. 2B, among other diagrams.

Some examples of possible devices that may be implemented to operate in accordance with any of the various examples, embodiments, options, and/or their equivalents, etc., described herein may include, but are not limited to, appliances within homes and businesses, etc., such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person, including watches, monitors such as those that monitor activity level, bodily functions such as heartbeat, breathing, and bodily activity, bodily motion or lack thereof, etc.; medical devices including intravenous medicine delivery-monitoring and/or controlling devices, blood-monitoring devices (e.g., glucose-monitoring devices) and/or any other types of medical devices, etc.; premises-monitoring devices such as movement-detection/monitoring devices, door closed/ajar detection/monitoring devices, security/alarm system monitoring devices, and/or any other type of premises-monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc., described herein.

The base stations (BSs) or access points (APs) 112-116 are operably coupled to the network hardware 134 via local area network (LAN) connections 136, 138, and 140. The network hardware 134, which may be a router, switch, bridge, modem, system controller, etc., provides a wide area network (WAN) connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel. Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116). Note that general reference to a communication device, such as WDEVs 118-132 and BSs or APs 112-116 in FIG. 1, or any other communication devices and/or WDEVs may alternatively be made generally herein using the term "device" (e.g., with respect to FIG. 2A below, "device 210" when referring to "wireless communication device 210" or "WDEV 210," or "devices 210-234" when referring to "wireless communication devices 210-234"; or, with respect to FIG. 2B below, use of "device 310" may alternatively be used when referring to "wireless communication device 310," or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, and other operation(s) separately, independently from one another). In some examples, such a processing circuitry includes all capability, functionality, and/or circuitry, etc., to perform such operations as described herein. In some other examples, such a communication interface includes all capability, functionality, and/or circuitry, etc., to perform such operations as described herein. In even other examples, such a processing circuitry and a communication interface include all capability, functionality, and/or circuitry, etc., to perform such operations as described herein, at least in part, cooperatively with one another.

In an example of implementation and operation, a WDEV (e.g., any one of the WDEVs 118-132 and BSs or APs 112-116, or consider either BS or AP 116 as a specific example) generates an orthogonal frequency-division multiple access (OFDMA) frame that includes a preamble that specifies allocation of at least one resource unit (RU) for a communication channel or nonallocation of the at least one RU for the communication channel.

In some examples, when the preamble specifies the allocation of the at least one RU for the communication channel, a multibit index of the preamble specifies at least one of a size or a location of the at least one RU allocated for the communication channel. In other examples, when the preamble specifies the nonallocation of the at least one RU for the communication channel, the multibit index of the preamble specifies the at least one of the size or the location of the at least one RU that is not allocated for the communication channel. The WDEV then transmits (e.g., via the communication channel) the OFDMA frame to at least one other WDEV to be processed by the at least one other WDEV to determine the allocation of the at least one RU for the communication channel or the nonallocation of the at least one RU for the communication channel.

Note that in other examples, the WDEV generates a preamble that specifies both the nonallocation of a first at least one RU for the communication channel and the allocation of a second at least one RU for the communication channel. Another WDEV (e.g., another one of the WDEVs 118-132 and BSs or APs 112-116, or consider WDEV 130 or WDEV 132 as a specific example) receives the OFDMA frame and process the preamble thereof to determine allocation and/or nonallocation of RU(s) specified therein. Subsequently, such WDEVs may support communications between each other based on any such allocation of RU(s) specified therein.

Figure 2:
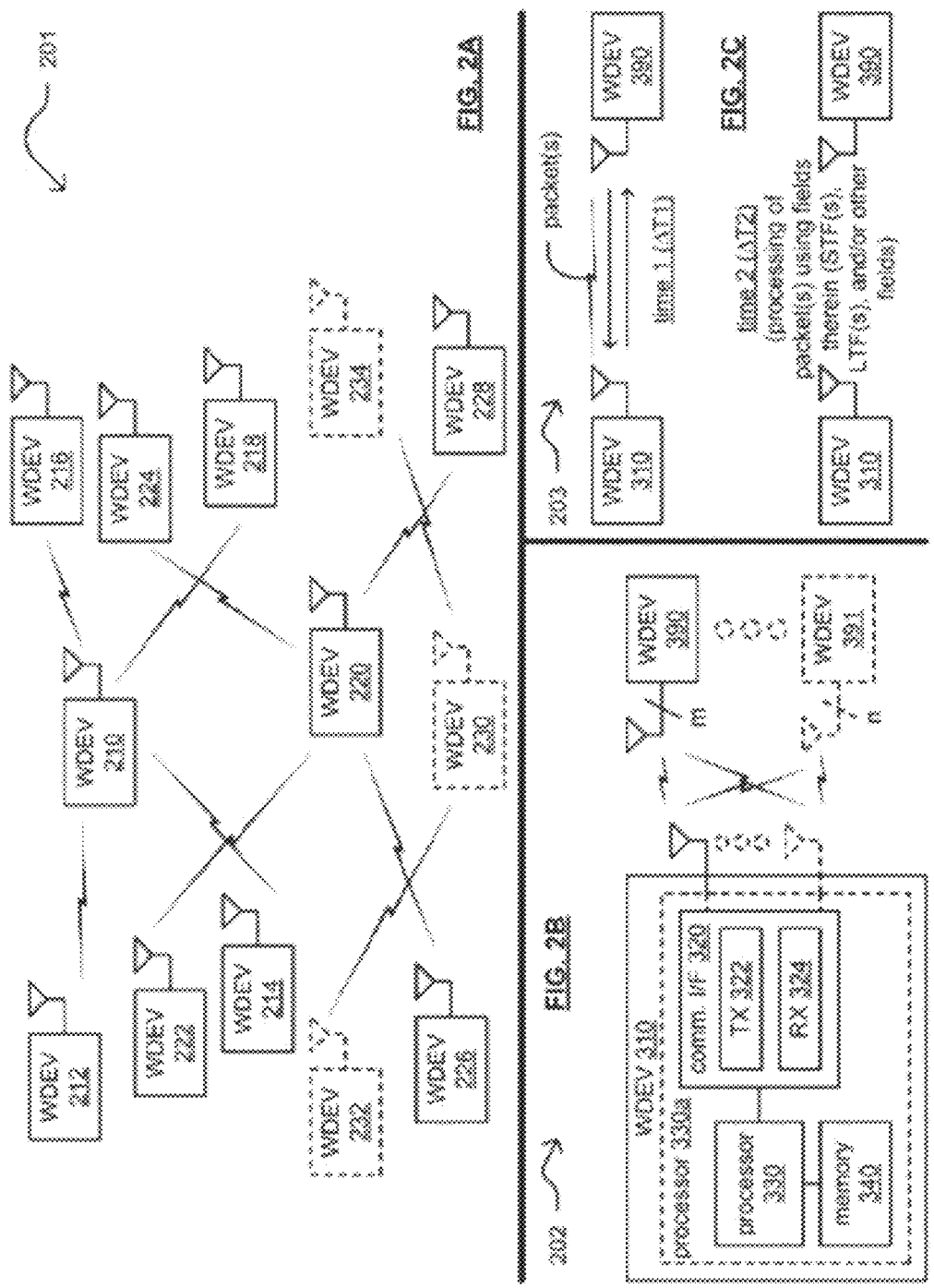
FIGS. 2A, 2B and 2C are diagrams illustrating an embodiment of a dense deployment of wireless communication devices and examples of communications between wireless communication devices.

FIGS. 2A, 2B and 2C are diagrams illustrating embodiments 201, 202 and 203 of a dense deployment of wireless communication devices and examples of communications between wireless communication devices. FIG. 2A shows an embodiment 201 of a dense deployment of WDEVs (shown as WDEVs in the diagram). In FIG. 2A, any of the various WDEVs 210-234 may be APs or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more WDEV types including WDEVs 118-132, and the APs or AP-operative STAs may be any type of one or more WDEVs including as BSs or APs 112-116, as shown in FIG. 1. Different groups of the WDEVs 210 through 234 may be partitioned into different basic services sets (BSSs). In some instances, at least one of the WDEVs 210-234 is included within at least one overlapping basic service set that covers two or more BSSs. As described above with the association of WDEVs in an AP-STA relationship, one of the WDEVs may be operative as an AP, and certain of the WDEVs can be implemented within the same BSS. In an example of implementation and operation, WDEV 210 generates an OFDMA frame that includes a preamble that specifies allocation of at least one RU for a communication channel, nonallocation of a first RU for the communication channel, or nonallocation of a second RU for the communication channel. In some examples, when the preamble specifies the allocation of the at least one RU for the communication channel, a multibit index of the preamble is set to a first value to specify at least one of a size or a location of the at least one RU allocated for the communication channel. In other examples, when the preamble specifies the nonallocation of the first RU for the communication channel, the multibit index of the preamble is set to a second value to specify the at least one of the size or the location of the first RU that is not allocated for the communication channel. In other examples, when the preamble specifies the nonallocation of the second RU for the communication channel, the multibit index of the preamble is set to a third value to specify at least one of another size or another location of the second RU that is not allocated for the communication channel. WDEV 210 then transmits, via the communication channel, the OFDMA frame to at least one other WDEV (e.g., WDEV 214 and/or WDEV 218), to be processed by the at least one other WDEV (e.g., WDEV 214 and/or WDEV 218), to determine the allocation of the at least one RU for the communication channel, the nonallocation of the first RU for the communication channel, or the nonallocation of the second RU for the communication channel.

In FIG. 2B, a WDEV 310 (e.g., which may be any one of devices 118-132 as with reference to FIG. 1) is in communication with another WDEV 390 (and/or any number of other WDEVs up through another WDEV 391) via a transmission medium. The WDEV 310 includes a communication interface 320 to perform transmitting and receiving of at least one signal, symbol, packet, frame, etc. (e.g., using a TX 322 and an RX 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital-to-analog converter (DAC) and/or an analog-to-digital converter (ADC), gain adjustment including scaling, filtering (e.g., in either the digital or analog domains), frequency conversion (e.g., such as frequency upscaling and/or frequency downscaling, such as to a baseband frequency at which one or more of the components of the WDEV 310 operates), equalization, pre-equalization, metric generation, symbol mapping and/or de-mapping, automatic gain control (AGC) operations, and/or any other operations that may be performed by an AFE and/or PHY component within a WDEV.

In some implementations, the WDEV 310 also includes a processing circuitry 330, and an associated memory 340, to execute various operations including interpreting at least one signal, symbol, packet, and/or frame transmitted to WDEV 390 and/or received from the WDEV 390 and/or WDEV 391. The WDEVs 310 and 390 (and/or 391) may be implemented using at least one integrated circuit in accordance with any desired configuration or combination of components, modules, etc., within at least one integrated circuit. Also, the WDEVs 310, 390, and/or 391 may each include one or more antennas for transmitting and/or receiving of at least one packet or frame (e.g., WDEV 390 may include m antennas, and WDEV 391 may include multiple antennas).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, one processing circuitry 330b may be implemented to include the processing circuitry 330 and the memory 340, yet the communication interface 320 is a separate circuitry.

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc., as described herein. In general, the various elements, components, etc., shown within the WDEV 310 may be implemented in any number of "processing modules," "processing circuits," "processors," and/or "processing units" (e.g., 1, 2, . . . , and generally using N, such "processing modules," "processing circuits," "processors," and/or "processing units," where N is a positive integer greater than or equal to 1).

In some examples, the WDEV 310 includes both processing circuitry 330 and communication interface 320 configured to perform various operations. In other examples, the WDEV 310 includes processing circuitry 330a configured to perform various operations. In even other examples, the WDEV 310 includes processing circuitry 330b configured to perform various operations. Generally, such operations include generating, transmitting, etc., signals intended for one or more other devices (e.g., WDEV 390 through 391) and receiving, processing, etc., other signals received for one or more other devices (e.g., WDEV 390 through 391).

In some examples, note that the communication interface 320, which is coupled to the processing circuitry 330, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the WDEV 310 may be communicated via any of these types of communication systems.

In FIG. 2C, at or during a first time (e.g., time 1 (ΔT1)), the WDEV 310 transmits signal(s) to WDEV 390 and/or the WDEV 390 transmits other signal(s) to WDEV 310. At or during a second time (e.g., time 2 (ΔT2)), the WDEV 310 processes signal(s) received from WDEV 390 and/or the WDEV 390 processes signal(s) received from WDEV 310.

In an example of operation and implementation, WDEV 310 generates an OFDMA frame that includes a preamble that specifies allocation of at least one RU for a communication channel or nonallocation of the at least one RU for the communication channel. In some examples, when the preamble specifies the allocation of the at least one RU for the communication channel, a multibit index of the preamble specifies at least one of a size or a location of the at least one RU allocated for the communication channel. In other examples, when the preamble specifies the nonallocation of the at least one RU for the communication channel, the multibit index of the preamble specifies the at least one of the size or the location of the at least one RU that is not allocated for the communication channel. The WDEV 310 then transmits, via the communication channel, the OFDMA frame to WDEV 390 to be processed by WDEV 390 to determine the allocation of the at least one RU for the communication channel or the nonallocation of the at least one RU for the communication channel. Then, the WDEV 390 receives and processes the received OFDMA frame and processes the OFDMA frame, including the preamble therein, to determine any allocation and/or nonallocation of RU(s) within a communication channel. Then, the WDEV 310 and the WDEV 390 can operate to support communications with each other based on any allocation of RU(s) within the communication channel.

In some examples, the WDEV 310 generates, when the preamble specifies the allocation of the at least one RU for the communication channel, the OFDMA frame to include at least one wireless STA identifier (ID) for which the at least one RU is allocated. In other examples, the WDEV 310 generates, when the preamble specifies the nonallocation of the at least one RU for the communication channel, the OFDMA frame to include the multibit index of the preamble that specifies the at least one of the size or the location of the at least one RU that is not allocated for the communication channel; specifies at least one of another size or another location of at least one other RU allocated for the communication channel; and generates the OFDMA frame to include at least one wireless STA ID for which the at least one other RU is allocated. Also, in even other examples, the WDEV 310 generates, when the preamble specifies allocation of at least two RUs for the communication channel, the OFDMA frame to include a first STA ID for which a first RU of the at least two RUs is allocated followed by a second STA ID for which a second RU of the at least two RUs is allocated.

In some examples, the WDEV 310 generates another OFDMA frame that includes another preamble that specifies nonallocation of at least one other RU for the communication channel, wherein another multibit index of another preamble specifies at least one of another size or another location of the at least one other RU that is not allocated for the communication channel. Then, the WDEV 310 transmits, via the communication channel, the another OFDMA frame to at least one of the at least one other wireless communication device or at least one additional wireless communication device to be processed by the at least one of the at least one other wireless communication device, or the at least one additional wireless communication device, to determine the nonallocation of the at least one other RU for the communication channel.

In some examples, note that a communication interface within the WDEV 310 (e.g., such as communication interface 320 as shown in FIG. 2B) may be implemented to support communications within a satellite communication system, a wireless communication system, a wired communication system, a fiber-optic communication system, and/or a mobile communication system.

In another example of implementation and operation, the WDEV 310 includes both a processing circuitry (e.g., such as processing circuitry 330, 330*a*, or 330*b* as shown in FIG. 2B) to perform many of the operations described above and a communication interface (e.g., such as communication interface 320 as shown in FIG. 2B), coupled to the processing circuitry, that is configured to support communications within a satellite communication system, a wireless communication system, a wired communication system, a fiber-optic communication system, and/or a mobile communication system. The processing circuitry is configured to transmit the first OFDMA packet and/or the second OFDMA packet to WDEV 390 and/or WDEV 391 via the communication interface.

Also, in some examples, note that RUs of 26 and 52 tones are implemented using a single stream (e.g., one user per RU). RUs of 106 tones or greater can have up to eight different streams. In certain examples, an RU allocation table may be used to specify all of the possible RUs such that allocation is made fully for 100% of the RU allocations. However, given that not every wireless communication device (e.g., network coordinator, AP) will have a certain number of antennas (e.g., eight antennas), and that performance of some RUs may be degraded, this disclosure presents various embodiments and examples in which certain cases (e.g., such as an example including four streams per 106 tones RU and the 26 tones RU straddling DC) where signaling is performed ahead for nonallocation and/or partial allocation of RUs in the table. Such cases include nonallocation of at least one other RU for the communication channel. In some examples, such cases operate by not using the full 100% of the RUs (e.g., nonallocation of at least one other RU for the communication channel). As also described elsewhere herein, when nonallocation of at least one other RU for the communication channel is specified, then a WDEV can operate by skipping the sending of the STA ID for at least one nonallocated RU (e.g., this reduces the preamble overhead and saves those STA ID-related bits from being sent over the communication medium).

Figure 3:
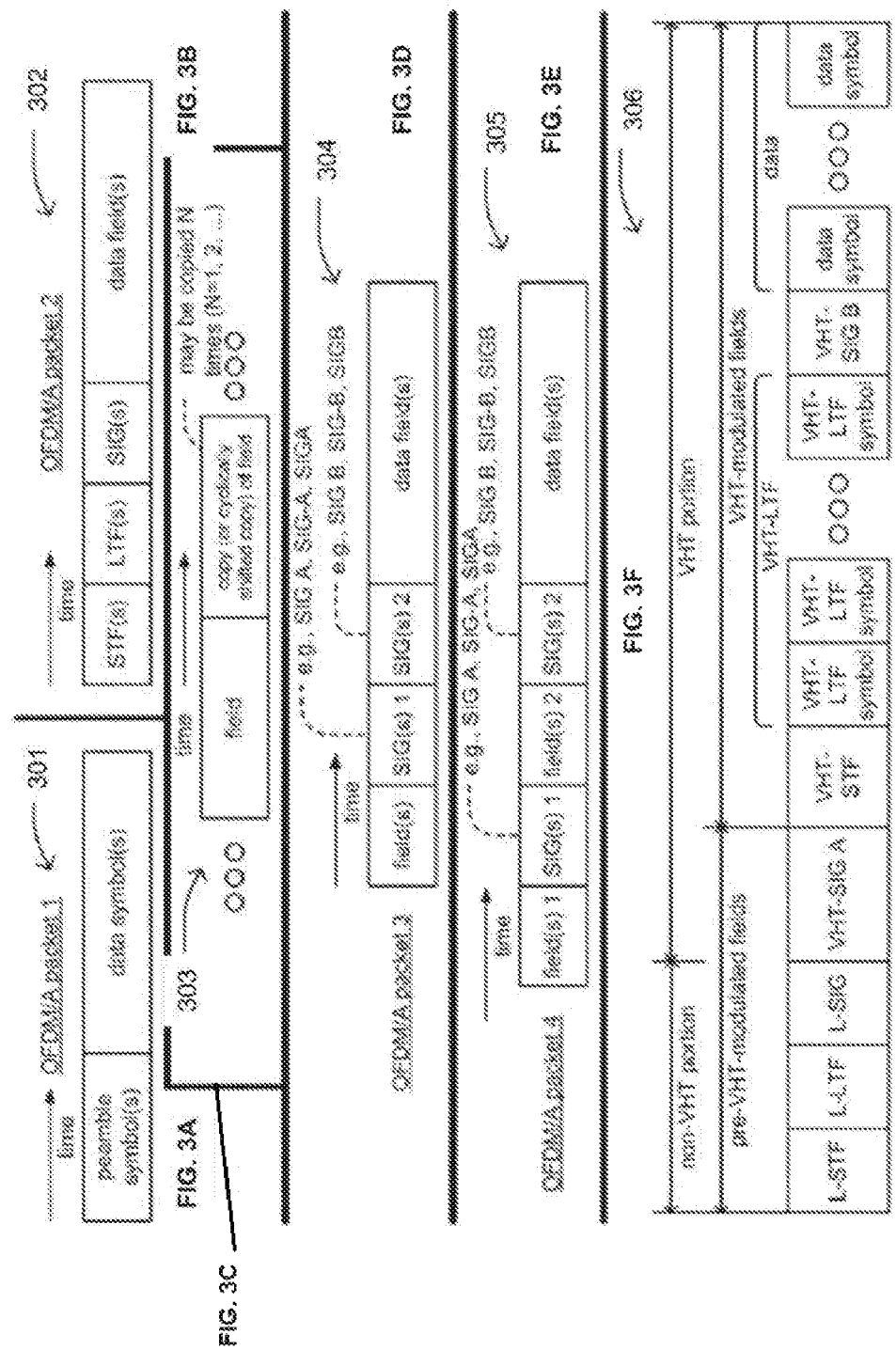
FIGS. 3A, 3B, 3C, 3D, 3E and 3F are diagrams illustrating examples of orthogonal frequency-division multiple access (OFDMA) packets of different types.

FIGS. 3A, 3B, 3C, 3D, 3E and 3F are diagrams illustrating examples of OFDMA packets of different types. FIG. 3A illustrates an example 301 of an OFDMA packet. This packet includes at least one preamble symbol followed by at least one data symbol. The at least one preamble symbol includes information for use in identifying, classifying, and/or categorizing the packet for appropriate processing.

FIG. 3B is a diagram illustrating another example 302 of an OFDMA packet of a second type. This packet also includes a preamble and data. The preamble is composed of at least one short training field (STF), at least one LTF, and at least one signal field (SIG). The data is composed of at least one data field. In both this example 302 and the prior example 301, the at least one data symbol and/or the at least one data field may generally be referred to as the payload of the packet. Among other purposes, STFs and LTFs can be used to assist a device to identify that a frame is about to start, to synchronize timers, to select an antenna configuration, to set receiver gain, to set up certain the modulation parameters for the remainder of the packet, and to perform channel estimation for uses such as beamforming, etc. In some examples, one or more STFs are used for gain adjustment (e.g., such as AGC adjustment), and a given STF may be repeated one or more times (e.g., repeated one time, in one example). In some examples, one or more LTFs are used for channel estimation, channel characterization, etc. (e.g., such as for determining a channel response, a channel transfer function), and a given LTF may be repeated one or more times (e.g., repeated up to eight times, in one example).

Among other purposes, the SIGs can include various information to describe the OFDM packet, including certain attributes such as data rate, packet length, number of symbols within the packet, channel width, modulation encoding, modulation coding set (MCS), modulation type, whether the packet has a single or multiuser frame, and frame length, etc., among other possible information.

FIG. 3C is a diagram illustrating another example 303 of at least one portion of an OFDMA packet of another type. A field within the packet may be copied one or more times therein (e.g., where N is the number of times that the field is copied, and N is any positive integer greater than or equal to 1). This copy may be a cyclically shifted copy. The copy may be modified in other ways from the original from which the copy is made.

FIG. 3D is a diagram illustrating another example 304 of an OFDMA packet of a third type. In this example 304, the OFDMA packet includes one or more fields followed by one or more first signal fields (SIG(s) 1) followed by one or more second signal fields (SIG(s) 2) followed by one or more data fields.

FIG. 3E is a diagram illustrating another example 305 of an OFDMA packet of a fourth type. In this example 305, the OFDMA packet includes one or more first fields followed by one or more first signal fields SIG(s) 1, followed by one or more second fields, followed by one or more second signal fields (SIG(s) 2, followed by one or more data fields.

FIG. 3F is a diagram illustrating another example 306 of an OFDMA packet. Such a general preamble format may be backward-compatible with prior Institute of Electrical and Electronics Engineers (IEEE) 802.11 prior standards, protocols, and/or recommended practices. In this example 306, the OFDMA packet includes a legacy portion (e.g., at least one legacy STF shown as L-STF, and legacy SIG shown as L-SIG) and a first signal field (SIG) (e.g., very high throughput (VHT) SIG (shown as SIG-A)). Then, the OFDMA packet includes one or more other VHT portions (e.g., VHT (STF shown as VHT-STF), one or more VHT (LTFs shown as VHT-LTF), a second SIG (e.g., VHT SIG (shown as SIG-B)), and one or more data symbols.

Figure 4:
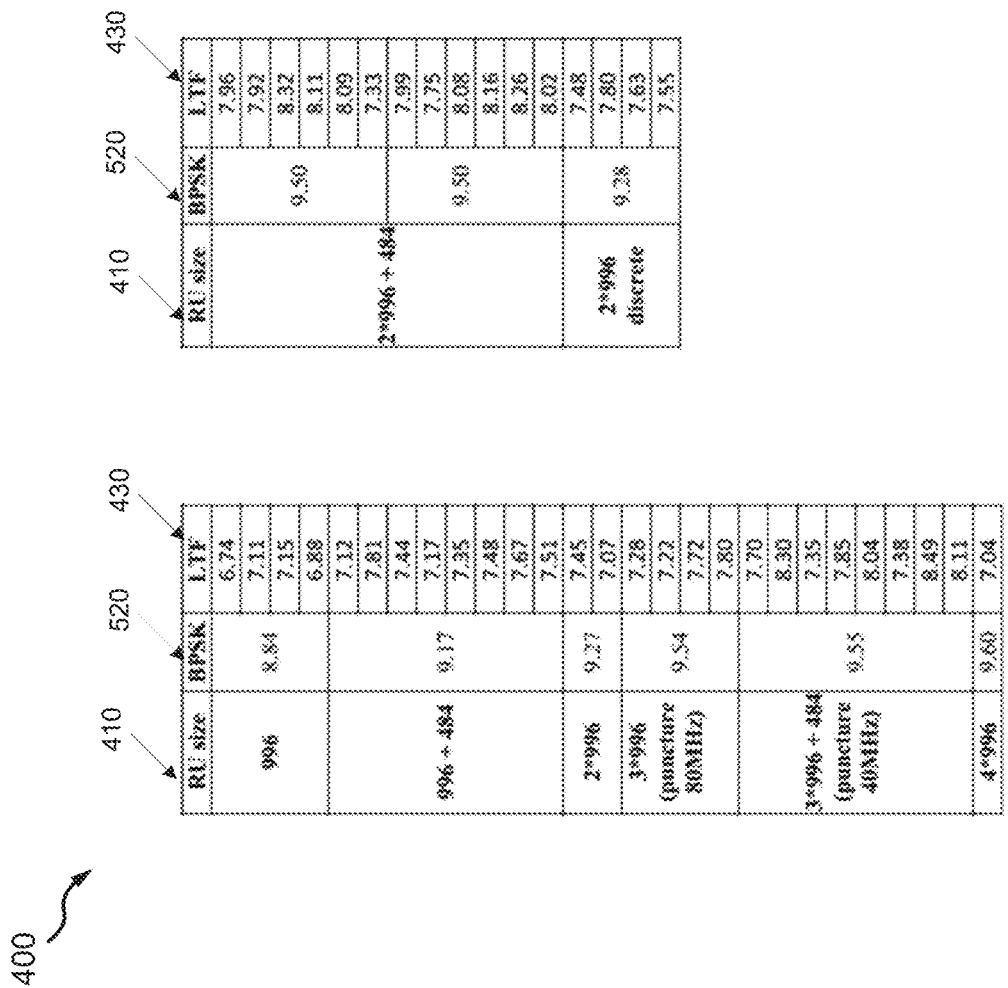
FIG. 4 is a table illustrating example values of multiple resource unit (RU) peak-to-average power ratio (PAPR) for 2×320 MHz extremely high throughput (EHT)-long training field (LTF), in accordance with some aspects of the subject technology.

FIG. 4 is a table 400 illustrating example values of multiple RU peak-to-average power ratio (PAPR) for 2×320 MHz extremely high throughput (EHT)-LTF, in accordance with some aspects of the subject technology. The RU size column 410 shows multiple combinations of the number of tones, which can be 996 for 80 MHz channel bandwidths, 484 for 40 MHz, 2*996 tones for 160 MHz, and 4*996 tones for 320 MHz channel bandwidths. The second column 420 provides median PAPR in dB for a binary phase-shift keying (BPSK) payload for various combinations of RUs in Wi-Fi. The third column 430 gives PAPR of the LTE sequence for various combinations of RUs. As seen from the table 400, the PAPR for 320 MHz of the subject technology has the lowest value of 7.04, which is a desirable value.

Figures 5A, 5B:
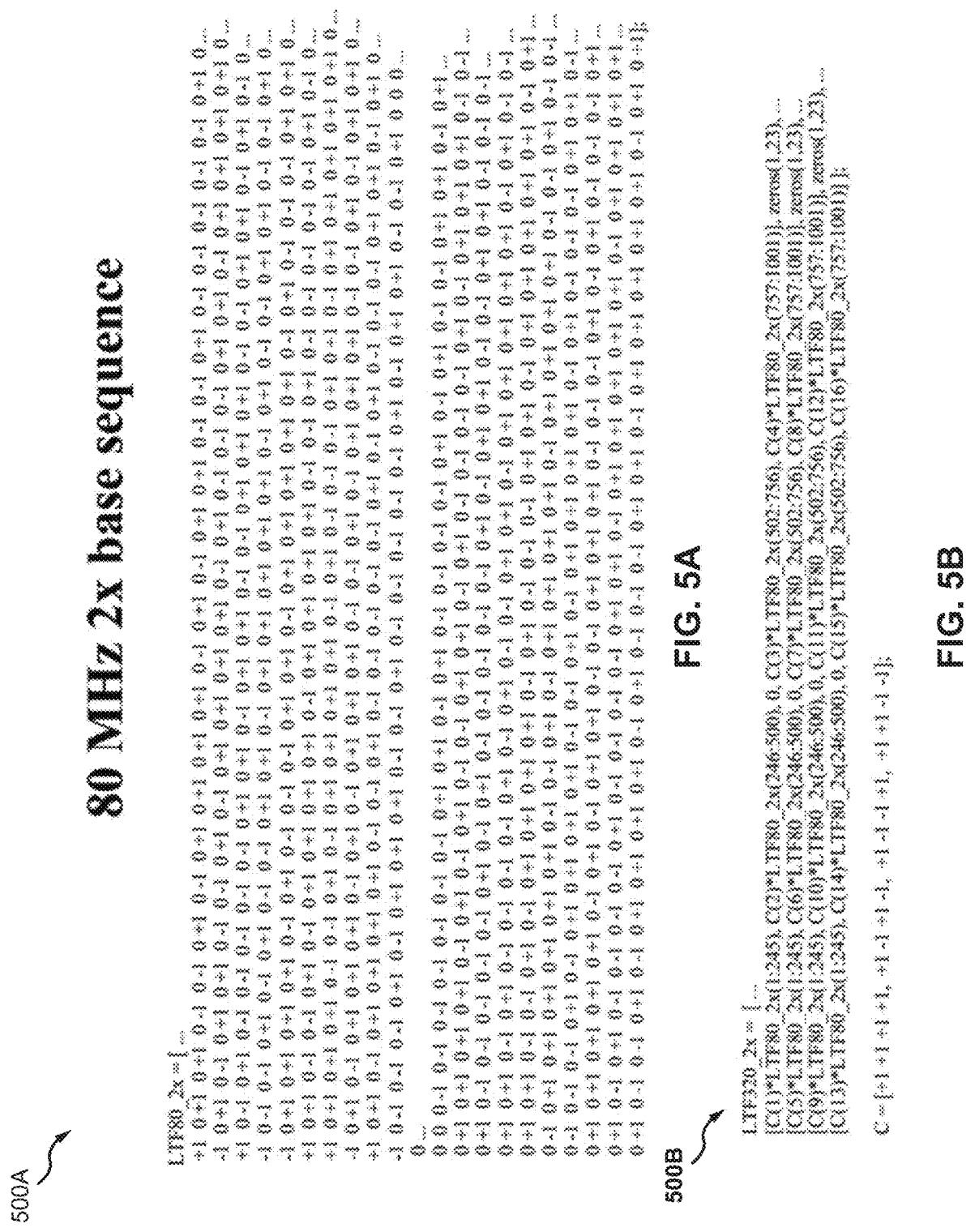

FIGS. 5A and 5B are diagrams, illustrating an example of a 2×320 MHz EHT-LTF base sequence 500A, and an example of an LTF sequence 500B formed based on the base sequence, respectively, in accordance with some aspects of the subject technology. The base sequence 500A is an LTF80_2x sequence, which is defined as a sequence of ones and zeros. The LTE sequence 500B is formed by combining various portions of the base sequence 500A with elements of a C vector. For example, the first element of the sequence is depicted with a notation C(1)*LTF80_2x(1:245), which indicates the element C(1) of the vector C (that is +1) is multiplied by elements 1 through 245 of the base sequence LTF80_2x (500A). The LTF sequence 500B of the subject technology is configured to provide a PAPR value for the OFDMA signal of interest so that the signal is minimally distorted by the power amplifier of a transmitter circuit. An algorithm for the optimization process will be described below.

FIGS. 5C, 5D, 5E, 5F, 5G and 5H are diagrams, illustrating examples of distributed RU (dRU) LTF base sequences, respectively, in accordance with some aspects of the subject technology. The base sequence 500A of FIG. 5A is for a regular RU (rRU) and is PAPR-optimized for rRU tones and pilot locations. The subject technology similarly generates base sequences that are PAPR-optimized for dRU LTF that involves a dRU (also known as interleaved) tone plan. The dRU tone plan spreads the rRU tones as much as possible to allow a higher total composite power, thus extending the Wi-Fi reach. The dRU LTF PAPR optimization process is similar to the rRU LTF PAPR optimization (described herein), except that it starts with remapping the rRU tones. Remapping the rRU LTF tones to the new dRU tone locations increases the PAPR to an acceptable level only if the pilots' locations are kept the same. Changing the pilots' locations may significantly increase the PAPR, and searching for the best pilots' locations that minimize the PAPR results in a nonregular pilot tones distribution. Remapping the rRU LTF tones to dRU can result in different composite sequence (to the receiver) depending on the allocated dRU. This is from the interlacing of the dRU where rRU are concatenated. The subject technology provides dRU LTF sequences that do not require remapping and use a hierarchical uniform pilots structure with a distance of 11 tones.

Figures 5C, 5D:
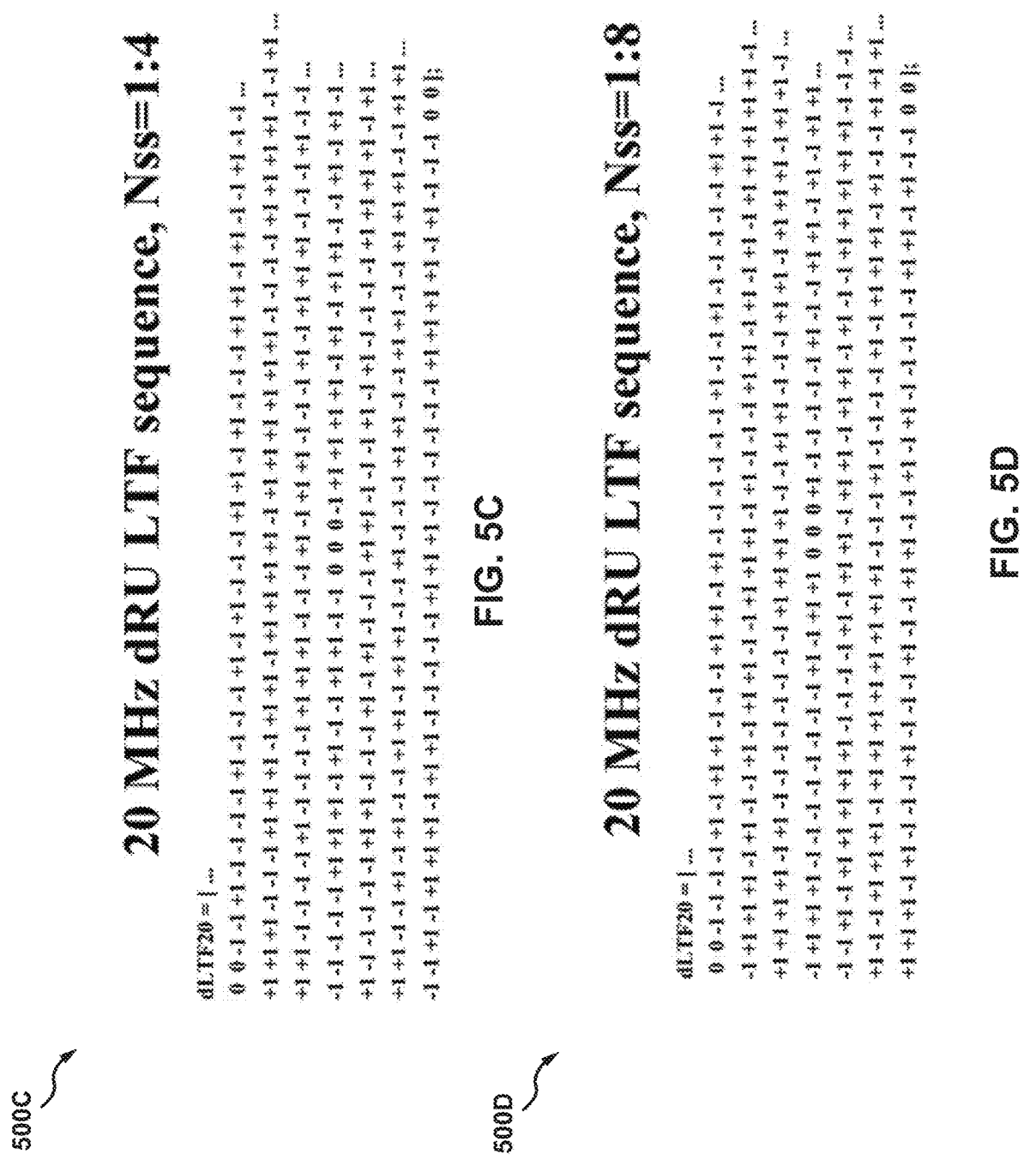

The dRU LTF base sequences 500C and 500D of FIGS. 5C and 5D are 20 MHz dRU LTF sequences for the number of spatial streams (Nss) of 1 through 4 and Nss of 1 through 8, respectively.

Figure 5E:
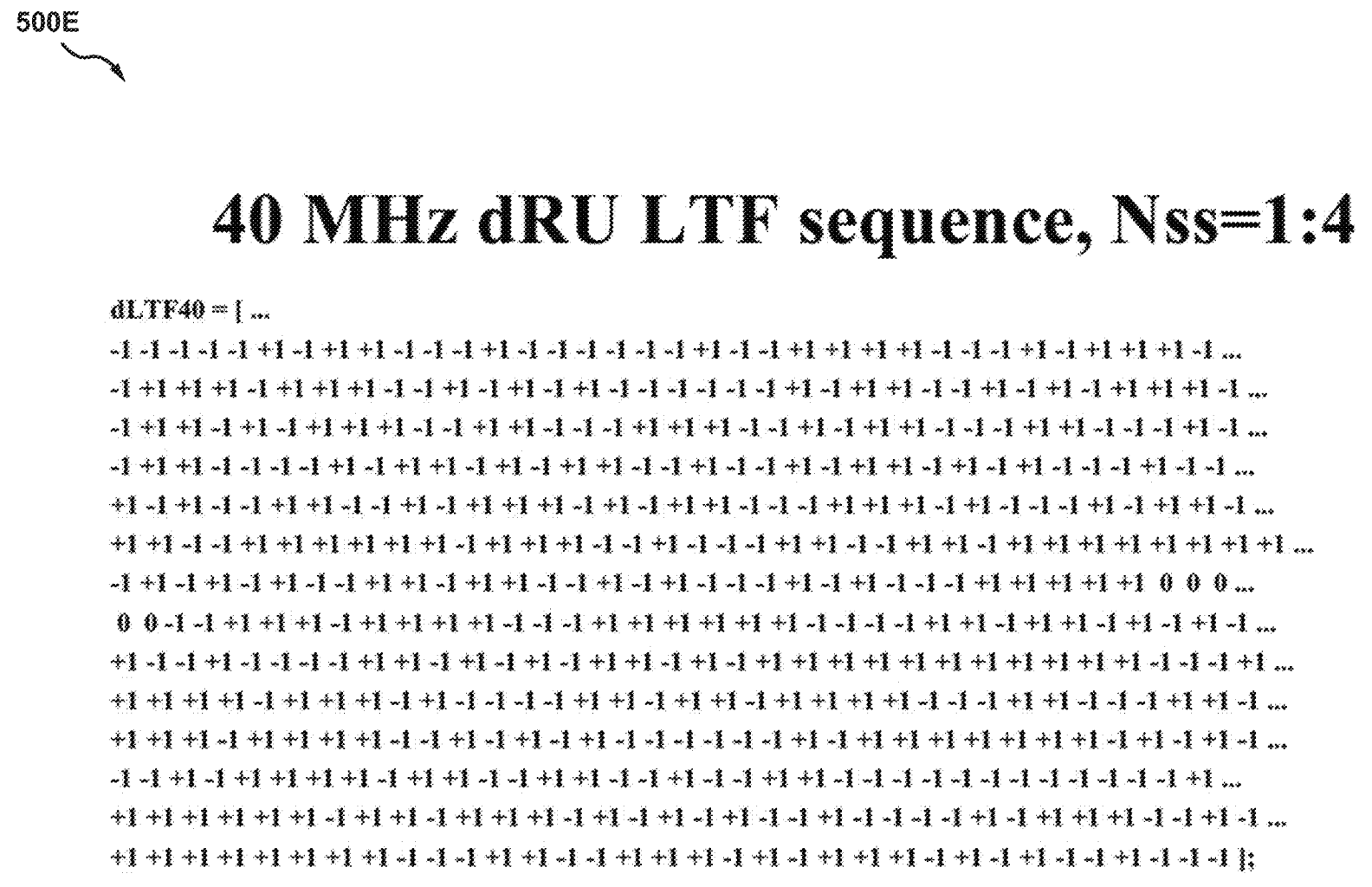
Figure 5F:
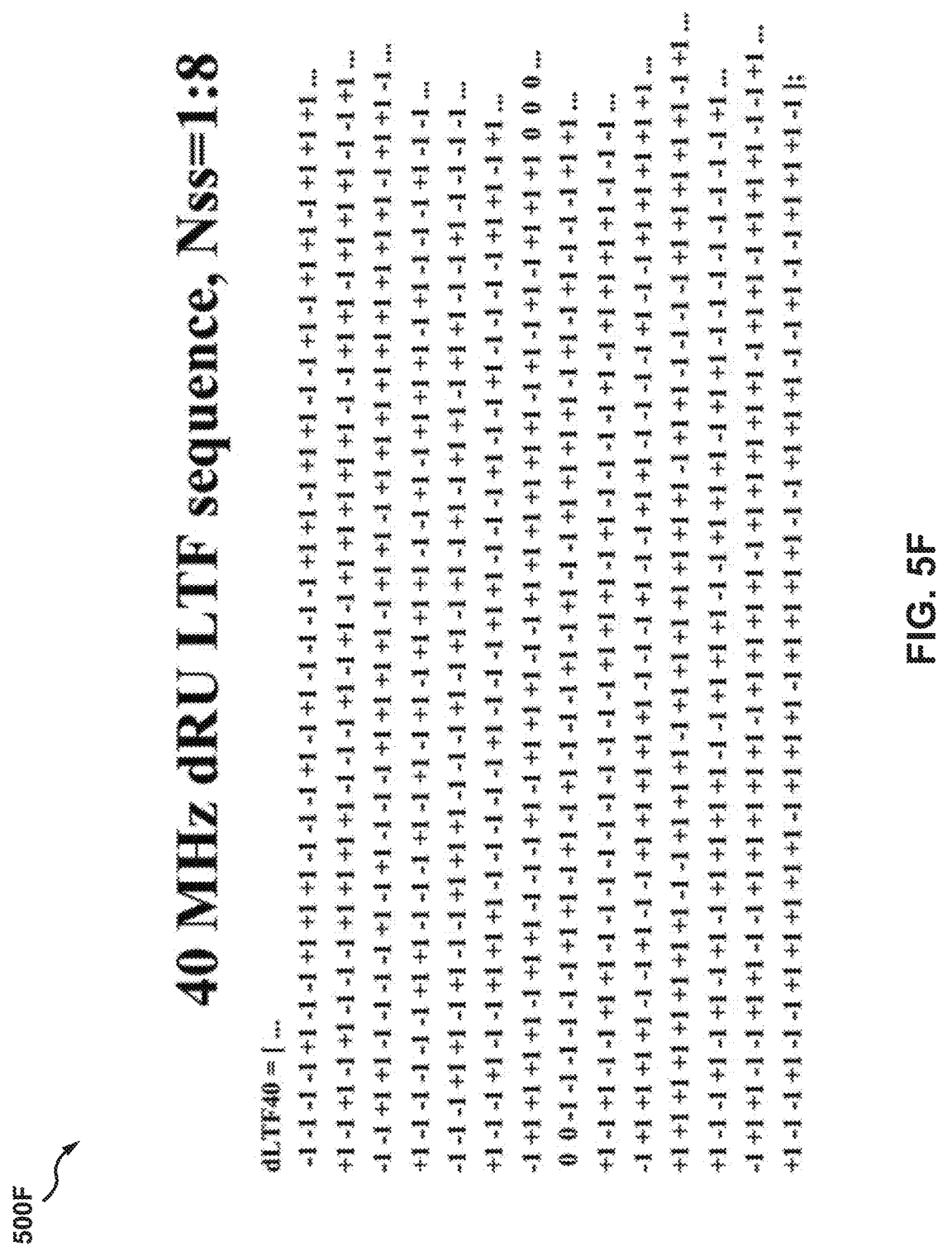

The dRU LTF base sequences 500E and 500F of FIGS. 5E and 5F are 40 MHz dRU LTF sequences for Nss of 1 through 4 and Nss of 1 through 8, respectively.

Figure 5G:
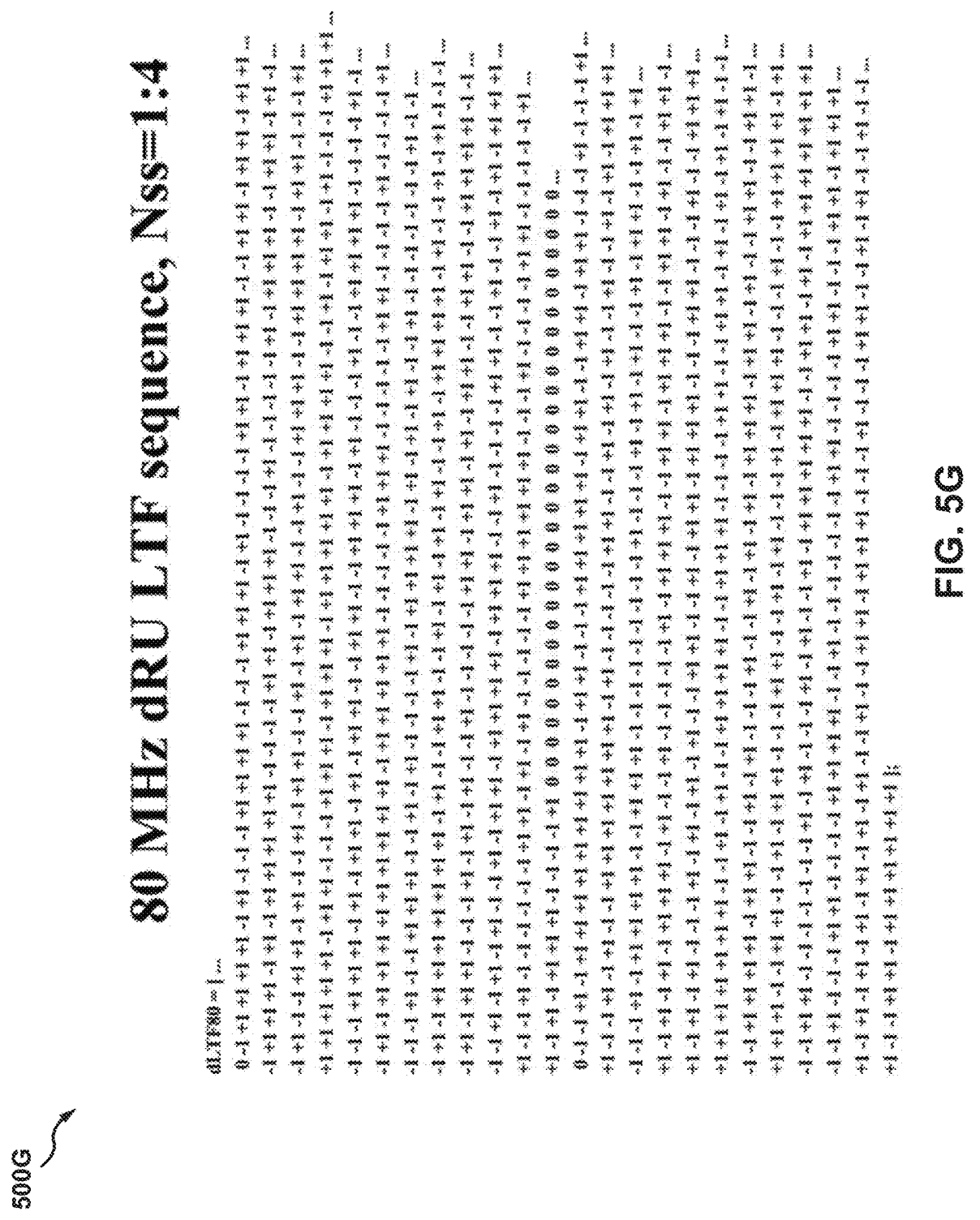
Figure 5H:
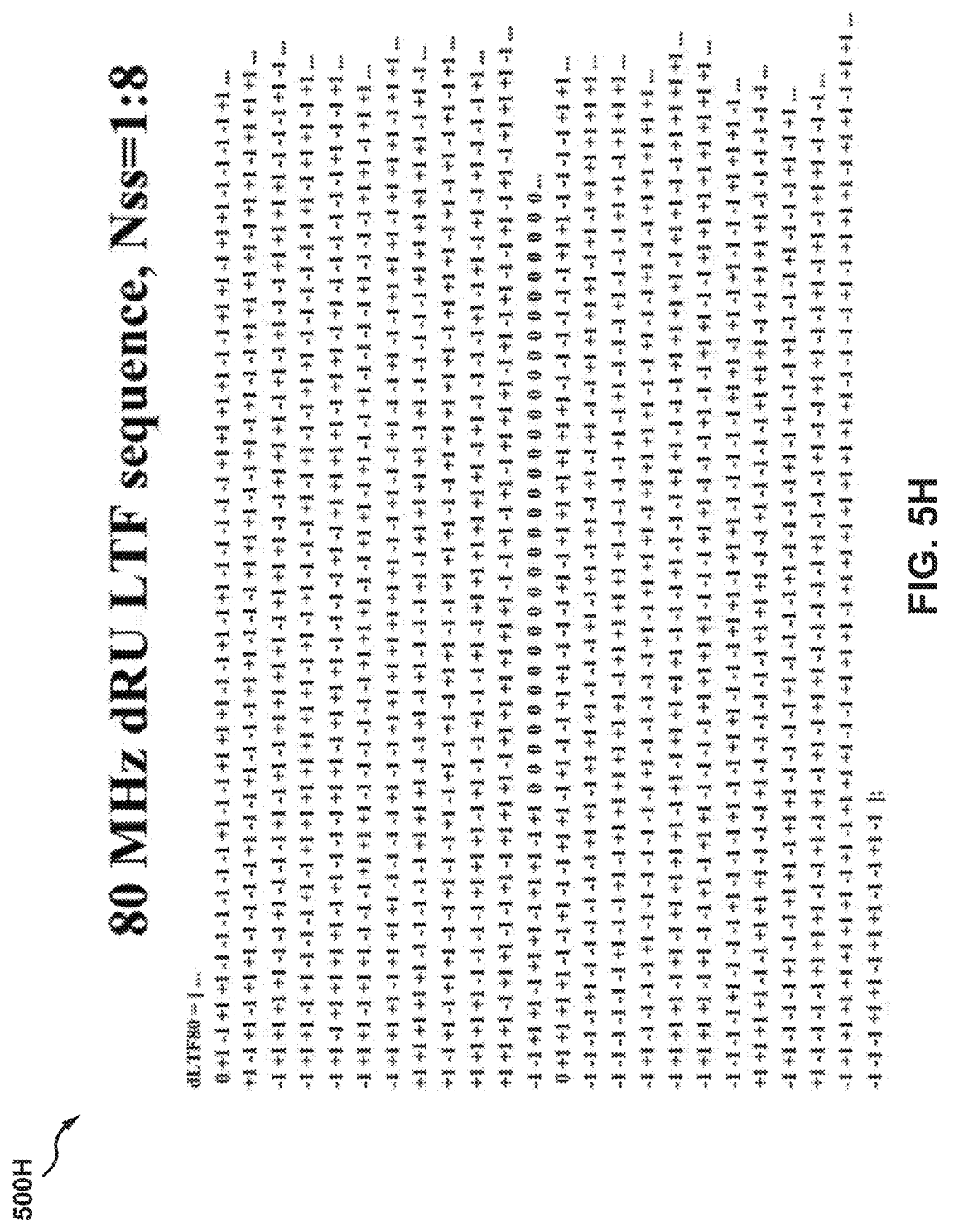

The dRU LTF base sequences 500G and 500H of FIGS. 5G and 5H are 80 MHz dRU LTF sequences for Nss of 1 through 4 and Nss of 1 through 8, respectively.

Figure 6:
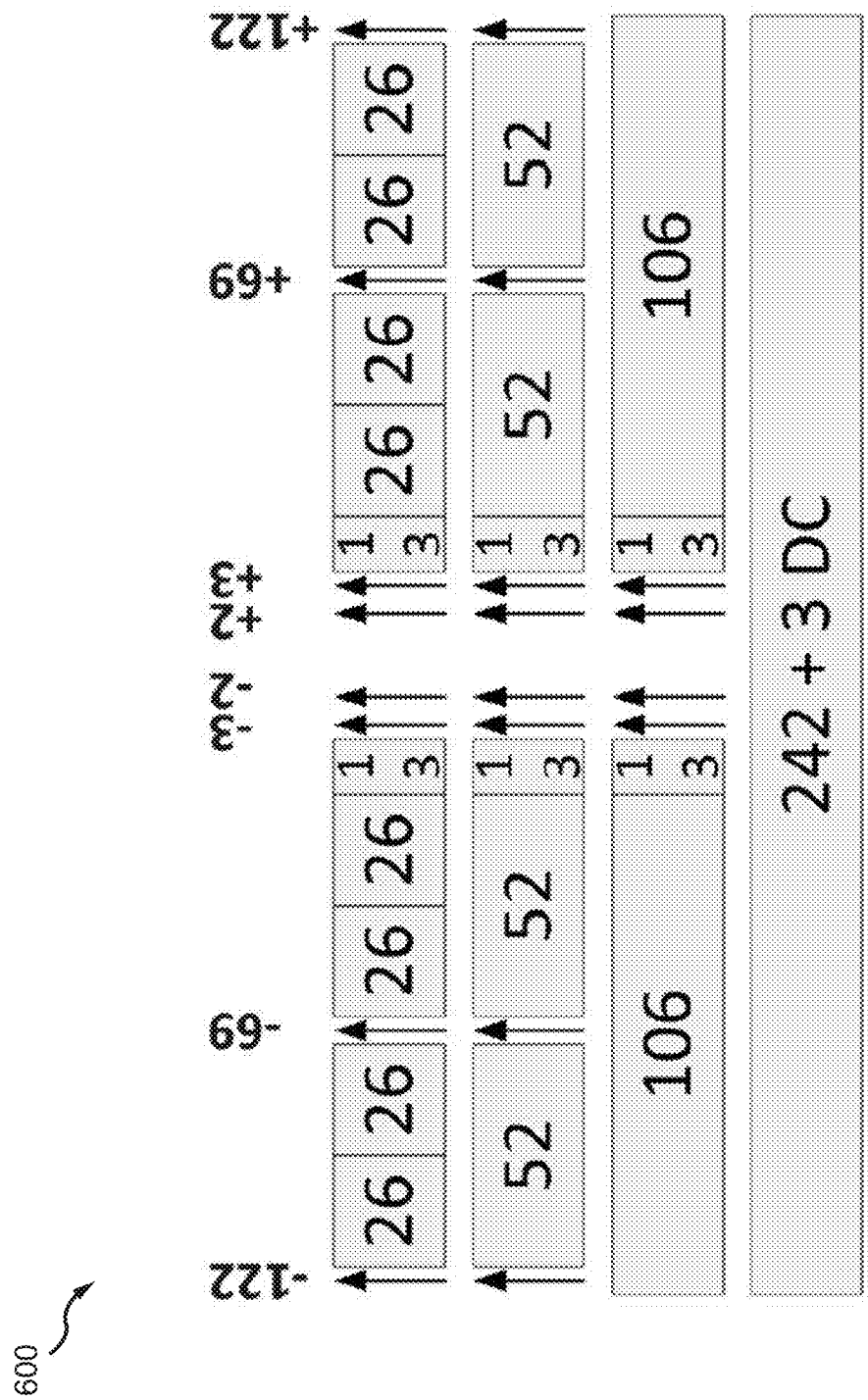
FIG. 6 is a diagram illustrating an example of a 20 MHz tone plan, in accordance with some aspects of the subject technology.

FIG. 6 is a diagram illustrating an example of a 20 MHz tone plan 600, in accordance with some aspects of the subject technology. The 20 MHz tone plan 600 is applicable to OFDMA and indicates that a number of tone plan options are available for a 320 MHZ bandwidth. There are nine RU26 (26-tone RUs), four RU52 (52-tone RUs), two RU106 (106-tone RUs), and finally one RU242 (242-tone RU) allocation options. Each RU52 allocation is the concatenation of two RU26 allocations. Each RU106 allocation is the concatenation of two RU52 allocations plus two leftover tones. The RU242 allocation is the concatenation of allocations of a left RU106, a center RU26 and a right RU106, plus four leftover tones. In some aspects, the RU26 and RU52 allocations can be implemented using a single stream (e.g., one user per RU). The RU106 tones or greater can have up to eight different streams.

Figure 7:
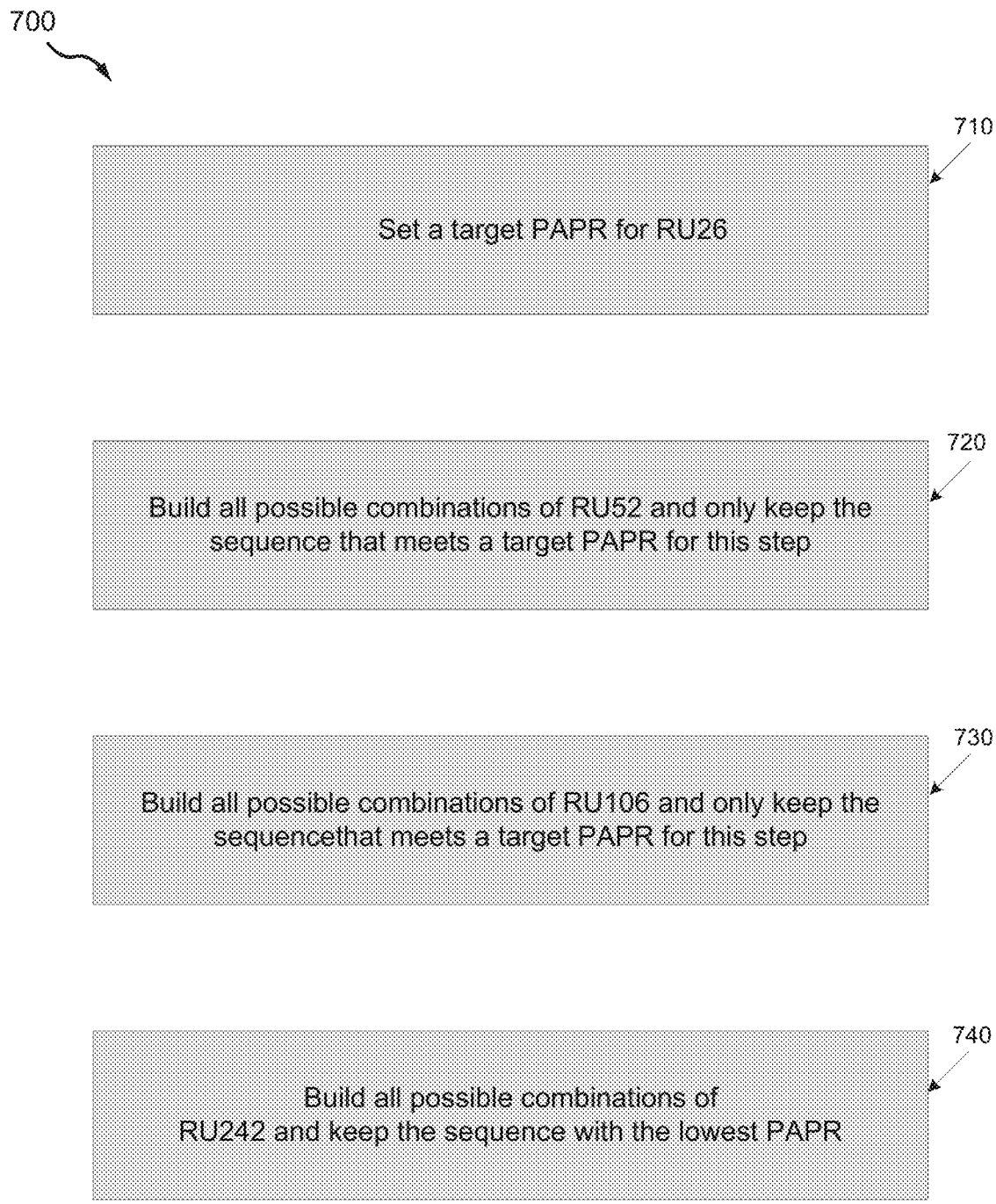
FIG. 7 is a flow diagram illustrating an example algorithm for optimizing an LTF PAPR, in accordance with some aspects of the subject technology.

FIG. 7 is a flow diagram illustrating an example algorithm 700 for optimizing an LTF PAPR, in accordance with some aspects of the subject technology. The algorithm 700 starts with an operation block 710 where a target PAPR is set for the RU26. If the set target PAPR is low, a large number of candidate sequences cannot be achieved. If the set target PAPR is high, a high number of candidate sequences will be achievable. The target PAPR is set in order to get a reasonable number of sequences, given the current computer speed and memory available. The RU26 search is exhaustive.

At operation block 720, using the RU26 LTF candidate sequences from a previous step, all possible combinations of RU52 are built and only the sequence that meets a target PAPR for this step is kept.

At operation block 730, using the RU52 LTF candidate sequences from the previous step and the four possible combinations of the two leftover tones, all possible combinations of RU106 are built and only the sequence that meets a target PAPR for this step is kept.

At operation block 740, using the RU106 LTF candidate sequences from previous step and the 16 possible combinations of the four leftover tones, all possible combinations of RU242 are built and the only sequence that meets a target PAPR for this step is kept.

With the four-step algorithm shown above and the hierarchical structure of the tone plan, a low PAPR for the 20 MHz RU242 is obtained, and, at the same time, all smaller RU will have a PAPR that is below the multiple targets PAPR that are set in each step. The process is similar for wider bandwidths (up to 320 MHz), except that there would be more steps and larger data sets. The implementation of the algorithm 700 is through computer simulations that can calculate the PAPR for different LTF candidate sequences.

FIGS. 8A and 8B are tables 800A and 800B illustrating an example of a spectrum configuration for forming a 320 MHz band and an example of a punctured channel indication pattern, respectively. The table 800A shows different spectrum-configuration options including 160 MHz and 80 MHz channels. In one example implementation, four 80 MHz channels or two 160 MHz channels of UNI15 are used. Other combinations using 80 MHz and 160 MHz channels of UNI15, UNI16, UNI17 and UNI18 are also shown.

The table 800B shows punctured channel-indication patterns for a 320 MHz physical-layer protocol data unit (PPDU) bandwidth. The puncturing patterns include eight 40 MHz channels that can be used for transmission. In certain situations, the transmitter and receiver may agree to not use the entire 320 MHz bandwidth and, for example, only use 280 MHz of the bandwidth. In that case, a 40 MHz puncture (nonused) in the spectrum is indicated by an X in the puncturing pattern. The cases shown in column 810 include no puncturing, 40 MHz puncturing and 80 MHz puncturing. For the no-puncturing case, all 40 MHz channels are used as indicated by ones (1's) in the puncturing pattern. For the 40 MHz puncturing, one 40 MHz channel, as indicated by x, in the puncturing patterns of column 820 is not used. For example, in the first case of the 40 MHz puncturing, the first field (with field value of 1, as indicated in column 830, is punctured; and, in the second case of 80 MHz puncturing, the first two bits of the puncturing pattern have no value (x), indicating that the first two 40 MHz channels are punctured).

Figure 9:
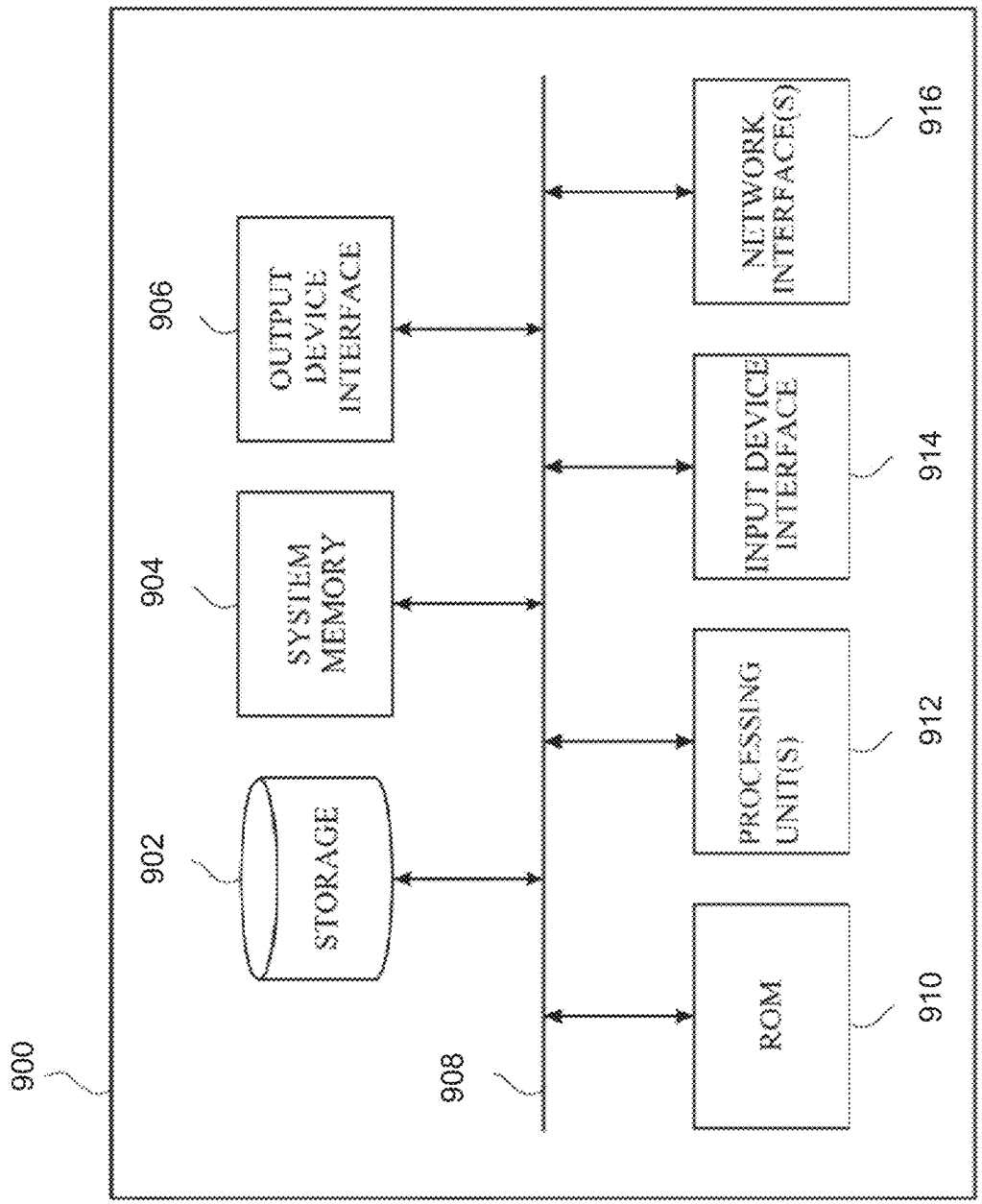
FIG. 9 is a block diagram illustrating an example of an electronic system within which aspects of the subject technology can be implemented.

FIG. 9 is a block diagram illustrating an example electronic system 900 within which aspects of the subject technology can be implemented. The electronic system 900 can be, and/or can be a part of, one or more of the electronic devices shown in FIG. 1, for example, a handheld communication device such as a smartphone, a smartwatch, a tablet or a laptop, a wireless router, a wireless AP, or other communication devices. The electronic system 900 may include various types of computer-readable media and interfaces for various other types of computer-readable media. The electronic system 900 includes a bus 908, one or more processor(s) 912, a system memory 904 (and/or buffer), a read-only memory (ROM) 910, a permanent storage device 902, an input-device interface 914, an output-device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processor(s) 912 with the ROM 910, the system memory 904, and the permanent storage device 902. From these various memory units, the one or more processor(s) 912 retrieve instructions to execute and data to process in order to execute the processes of the subject disclosure. The one or more processor(s) 912 can be a single processor or a multicore processor in different implementations. The ROM 910 stores static data and instructions that are needed by the one or more processor(s) 912 and other modules of the electronic system 900. The permanent storage device 902, on the other hand, may be a read-and-write memory device. The permanent storage device 902 may be a nonvolatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory such as random-access memory (RAM). The system memory 904 may store any of the instructions and data that one or more processor(s) 912 may need at runtime. In one or more implementations, the processes of the subject disclosure are stored in the system memory 904, the permanent storage device 902, and/or the ROM 910. From these various memory units, the one or more processor(s) 912 retrieve instructions to execute and data to process in order to execute the processes of one or more implementations.

The bus 908 also connects to the input- and output-device interfaces 914 and 906. The input-device interface 914 enables a user to communicate information and select commands to the electronic system 900. Input devices that may be used with the input-device interface 914 may include, for example, alphanumeric keyboards and pointing devices (also called "cursor control devices"). The output-device interface 906 may enable, for example, the display of images generated by electronic system 900. Output devices that may be used with the output-device interface 906 may include, for example, printers and display devices such as a liquid crystal display, a light-emitting diode display, an organic light emitting diode display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes through the one or more network interface(s) 916. In this manner, the electronic system 900 can be a part of a network of computers such as a LAN, a wide-area network (WAN), or an Intranet or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be nontransitory in nature.

The computer-readable storage medium can be any storage medium that can be read, written, or otherwise accessed by a general purpose or special-purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM and TTRAM. The computer-readable medium also can include any nonvolatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG and Millipede memory.

Further, the computer-readable storage medium can include any nonsemiconductor memory such as optical disk storage, magnetic disk storage, magnetic tape, other magnetic storage devices or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or nonexecutable machine code or as instructions in a high-level language that can be compiled to produce executable or nonexecutable machine code. Further, instructions also can be realized as or can include data. Computer-executable instructions also can be organized in any format, including routines, subroutines, programs, data structures, objects, modules, applications, applets and functions, etc. As recognized by those of skill in the art, details including, but not limited to, the number, structure, sequence, and organization of instructions can vary significantly without varying the underlying logic, function, processing and output.

While the above discussion primarily refers to microprocessor or multi-core processors that execute software, one or more implementations are performed by one or more integrated circuits, such as application-specific integrated circuits (ASICs) or field-programmable gate arrays (FPGAs). In one or more implementations, such integrated circuits execute instructions that are stored on the circuit itself.

Those of skill in the art would appreciate that the various illustrative blocks, modules, elements, components, methods and algorithms described herein may be implemented as electronic hardware, computer software, or combinations of both. To illustrate this interchangeability of hardware and software, various illustrative blocks, modules, elements, components, methods and algorithms have been described above generally in terms of their functionality. Whether such functionality is implemented as hardware or software depends upon the particular application and design constraints imposed on the overall system. Skilled artisans may implement the described functionality in varying ways for each application. Various components and blocks may be arranged differently (e.g., arranged in a different order, or partitioned in a different way) all without departing from the scope of the subject technology. Further, various functional blocks need not be connected directly (even though, for convenience, they are illustrated that way in the figures).

It is understood that any specific order or hierarchy of blocks in the processes disclosed is an illustration of example approaches. Based upon design preferences, it is understood that the specific order or hierarchy of blocks in the processes may be rearranged, or that not all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B or only C; any combination of A, B and C; and/or at least one of each of A, B and C.

The predicate words "configured to," "operable to" and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure" and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the terms "include," "have" or the like are used in the description or the claims, such terms are intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter genders (e.g., her and its) and vice versa. Headings and subheadings, if any, are used for convenience only and do not limit the subject disclosure.

What is claimed is:

1. A device comprising:
a communication interface; and
processing circuitry coupled to the communication interface, wherein at least one of the communication interface or the processing circuitry is configured to generate an orthogonal frequency-division multiple access (OFDMA) frame that includes a preamble that specifies allocation of at least one resource unit (RU) for a communication channel or nonallocation of the at least one RU for the communication channel, and wherein the preamble includes at least one long training field (LTF) to be used by a receiver for channel estimation, and the LTF includes an extremely high-throughput (EHT)-LTF sequence;
wherein nonallocation of the at least one RU for the communication channel causes skipping sending, by the receiver, a station identifier (STA ID) for the at least one nonallocated RU; and
wherein the EHT-LTF sequence is configured to provide a peak-to-average power ratio (PAPR) to reduce distortion of a signal of interest of the ODFMA frame by a power amplifier of a transmitter of the communication interface.

2. The device of claim 1, wherein the EHT-LTF sequences comprise a 320 MHz EHT-regular RU (rRU) LTF.

3. The device of claim 2, wherein the 320 MHz EHT-rRU LTF is constructed based on an 80 MHz base sequence.

4. The device of claim 3, wherein the 320 MHz EHT-rRU LTF is constructed based on the 80 MHz base sequence by expanding the 80 MHz base sequence using eight or 16 coefficient values.

5. The device of claim 4, wherein the 320 MHz EHT-rRU LTF features a reduced peak-to-average power ratio (PAPR).

6. The device of claim 1, wherein the EHT-LTF sequences comprise a 320 MHz EHT-LTF, which is constructed based on a 20 MHz distributed RU (dRU) LTF sequence with up to four or eight spatial streams.

7. The device of claim 1, wherein the EHT-LTF sequences comprise a 320 MHz EHT-LTF, which is constructed based on a 40 MHz dRU LTF sequence with up to four or eight spatial streams.

8. The device of claim 1, wherein the EHT-LTF sequences comprise a 320 MHz EHT-LTF, which is constructed based on at least one of a first set and a second set of sequences with up to four or eight spatial streams, wherein the first set of sequences comprises one or more 80 MHz dRU LTF sequences and the second set of sequences comprises one or more 80 MHz rRU LTF sequences.

9. The device of claim 1, wherein a dRU tone plan is used to spread rRU tones to reduce power spectral density to allow an increased total composite power in order to extend a Wi-Fi reach of the device.

10. The device of claim 1, wherein the LTF sequences are configured to avoid remapping of locations of RUs and use a hierarchical uniform pilots structure with a distance of 11 tones.

11. The method of claim 10, wherein the EHT-LTF sequences comprise a 320 MHz EHT-regular RU (rRU) LTF.

12. The method of claim 11, wherein the 320 MHz EHT-rRU LTF is constructed based on the 80 MHz base sequence by expanding the 80 MHz base sequence using eight or 16 coefficient values.

13. The method of claim 10, further comprising constructing LTF sequences without remapping of locations of RUs and using a hierarchical uniform pilots structure with a distance of 11 tones.

14. The method of claim 1, wherein a dRU tone plan is used to spread rRU tones to reduce power spectral density to allow an increased total composite power in order to extend a Wi-Fi reach of the device.

15. A method comprising:
generating, by a processing circuitry, a preamble that specifies allocation of at least one resource unit (RU) for a communication channel or nonallocation of the at least one RU for the communication channel, wherein the preamble includes at least one long training field (LTF) to be used by a receiver for channel estimation, and the LTF includes an extremely high-throughput (EHT)-LTF sequence;

including, by the processing circuitry, the preamble an orthogonal frequency-division multiple access (OFDMA) frame;

communicating, by the processing circuitry, via a communicate interface the ODFMA frame to a receiver, wherein nonallocation of the at least one RU for the communication channel causes skipping sending, by the receiver, a station identifier (STA ID) for the at least one nonallocated RU; and wherein the EHT-LTF sequence is configured to provide a peak-to-average power ratio (PAPR) to reduce distortion of a signal of interest of the ODFMA frame by a power amplifier of a transmitter of the communication interface.

16. The method of claim 15, wherein the 320 MHz EHT-rRU LTF is constructed based on an 80 MHz base sequence.

17. The method of claim 16, wherein the 320 MHz EHT-rRU LTF features the reduced peak-to-average power ratio (PAPR).

18. The method of claim 15, wherein the EHT-LTF sequences comprise a 320 MHz EHT-LTF, which is constructed based on a 20 MHz distributed RU (dRU) LTF sequence with up to four or eight spatial streams.

19. The method of claim 15, wherein the EHT-LTF sequences comprise a 320 MHz EHT-LTF, which is constructed based on a 40 MHz dRU LTF sequence with up to four or eight spatial streams.

20. The method of claim 15, wherein the EHT-LTF sequences comprise a 320 MHz EHT-LTF, which is constructed based on at least one of a first set and a second set of sequences with up to four or eight spatial streams, wherein the first set of sequences comprises one or more 80 MHz dRU LTF sequences and the second set of sequences comprises one or more 80 MHz rRU LTF sequences.

21. An electronic system comprising:

one or more processors, coupled to memory and configured to:

generate a preamble that specifies allocation of at least one resource unit (RU) for a communication channel or nonallocation of the at least one RU for the communication channel, wherein the preamble includes at least one long training field (LTF) to be used by a receiver for channel estimation, and the LTF includes an extremely high-throughput (EHT)-LTF sequence;

generate an orthogonal frequency-division multiple access (OFDMA) frame to include the preamble;

communicate via a communicate interface the ODFMA frame to a receiver, wherein nonallocation of the at least one RU for the communication channel causes skipping sending, by the receiver, a station identifier (STA ID) for the at least one nonallocated RU; and wherein the EHT-LTF sequence is configured to provide a peak-to-average power ratio (PAPR) to reduce distortion of a signal of interest of the ODFMA frame by a power amplifier of a transmitter of the communication interface.

22. The electronic system of claim 21, wherein the one or more processors are further configured to construct LTF sequences without remapping of locations of RUs and using a hierarchical uniform pilots structure with a distance of 11 tones.

* * * * *